United States Patent
Onural et al.

(10) Patent No.: US 6,337,917 B1
(45) Date of Patent: Jan. 8, 2002

(54) RULE-BASED MOVING OBJECT SEGMENTATION

(76) Inventors: Levent Onural, Bilkent University Houses 10/1, Ankara TR-06533 (TR); Abdullah Aydin Alatan, 404 Cinder Rd., Edison, NJ (US) 08820; Ertem Tuncel, 784 Laurel Walk Apt. L, Goleta, CA (US) 93117

( * ) Notice: Subject to any disclaimer, the term of this patent is extended or adjusted under 35 U.S.C. 154(b) by 0 days.

(21) Appl. No.: 09/337,591

(22) Filed: Jun. 21, 1999

Related U.S. Application Data

(63) Continuation of application No. PCT/TR98/00001, filed on Jan. 15, 1998.

(30) Foreign Application Priority Data

Jan. 29, 1997 (TR) .............................. 97/00058

(51) Int. Cl.[7] .................................. G06K 9/00
(52) U.S. Cl. ................... 382/107; 382/173; 382/283
(58) Field of Search ............................... 382/103, 107, 382/162, 164, 165, 173, 205, 283

(56) References Cited

U.S. PATENT DOCUMENTS

| | | | | |
|---|---|---|---|---|
| 5,706,355 A | * | 1/1998 | Raboisson et al. | 382/104 |
| 5,825,917 A | * | 10/1998 | Suzuki | 382/164 |
| 5,907,361 A | * | 5/1999 | Okada | 348/399 |
| 5,912,994 A | * | 6/1999 | Norton et al. | 382/283 |
| 5,917,936 A | * | 6/1999 | Katto | 382/154 |
| 6,075,875 A | * | 6/2000 | Gu | 382/107 |

* cited by examiner

Primary Examiner—Matthew C. Bella

(57) ABSTRACT

A rule-based method which detects and tracks the moving objects in video frames in an automated way is invented. The method can be used in object based image sequence compression applications. Motion of pixels between two consecutive frames are estimated using a block based motion estimation method, and the resultant dense motion vector field is segmented. Using the same method, a second segmentation is achieved based on partitioning of the image according to color values of the pixels. The image, which is formed by the translation of the final segmentation results of the previous frame using the estimated motion vectors, is used as the third segmentation. By the help of a sequence of rules, which uses the three different segmentation masks as its inputs, detection and tracking of moving objects in the scene is achieved within accurate boundaries; the problems caused by occlusion or uncovered background are insignificant.

11 Claims, 3 Drawing Sheets

RULE-BASED MOVING OBJECT SEGMENTATION

This application is a continuation of international application number PCT TR98/00007, filed Jan. 15, 1998.

This invention is about the detection and tracking of moving objects in the scene for object-based image sequence (video) compression applications.

BACKGROUND OF THE INVENTION

A video consists of a sequence of consecutive frames. Every frame is a still image itself but what creates the motion are the differences between consecutive frames. There are several advantages of automatically detecting and tracking the motion of objects in these frames. Automatic target tracking, robot navigation, and obstacle avoidance are the immediate examples. The analysis of moving objects in recent object-based video coding functionalities aims mainly such goals as selective coding of objects, improved coding efficiency, selective error robustness and content-based visual database query/indexing.

What is desired in detecting objects automatically is that, the detected object should have some semantic meaning in everyday life. The method should also be able to track the objects in addition to detecting them. It should be noted that several distinct objects may move independently, or a single object may have articulated motion. In these kind of situations, an object should be allowed to split into several objects and to merge into one again when needed. Furthermore, it should be considered that an object may be covered by another one for a while, and then emerge again in the scene. Besides all, for the sake of a high coding performance, the boundaries which are obtained as the result of the segmentation process should be as close as possible to the true boundaries of the object.

Up to now, moving objects on image sequences are worked on by various methods. Majority of these existing methods deal only with the tracking of objects which are pre-defined with marked locations. For example, U.S. Pat. No. 5,323,470, 5,280,530, and 5,430,809 deal only with the tracking of the human face. Examples of other patents, which can track without looking into the content of the object, are U.S. Pat. Nos. 5,537,119, 5,473,369, 5,552,823, 5,379,236, 5,430,809, 5,473,364 and Turkish Patent no 89/00601. In general, these methods achieve tracking by finding the counterpart of the object in the subsequent frame, given the object in the current frame. Since the automatic detection of objects is absent, all these methods are semi-automatic and can only work by user interaction. Besides, they do not consider complicated situations, such as splitting of the tracked object or existence of different motion characteristics at different parts of the object. Moreover, they do not attempt to achieve accurate object boundaries. On the contrary, the proposed method is designed to perform fully automatic object detection. In contrast to abovementioned methods, there are no limitations like human face only objects; there are no restrictions, at any stage of the method, based on the inputs. Another diversity compared to the existing state of the art is that the new method includes a tool which can find the accurate boundaries of an object in addition to its detection.

Some other existing methods target only to detect the moving objects using consecutive frames. For example, U.S. Pat. Nos. 5,258,836, 5,394,196, 5,479,218, 5,557,684, and Europan Patent no EP0691789A2 are related to this issue. In general, these methods define objects by clustering the estimated motion vectors. The boundaries of the objects found by these methods may be inadequate in some applications either due to utilization of block based motion estimates, or as a consequence of the the occlusions which are not taken care of. Usually, these motion vectors are estimated from the given image sequence but the resultant vectors may be erroneous. If segmentation is based on clustering of these possibly erroneous motion vectors, it is inevitable to obtain incorrect object boundaries. The proposed method, on the other hand, achieves the detection of objects by utilizing not only the motion vectors, but also the color information and the previous segmentation result. Another difference of the described method compared to those prior methods is the ability to achieve the detection and the tracking of objects simultaneously.

TECHNICAL PROBLEMS AIMED TO BE SOLVED BY THE INVENTION

One of the achievements of this invention is to detect the objects in a given image sequence (video) recording and to segment them by keeping their original forms as encountered in everyday life, in an automated fashion. The boundaries of these objects can be found accurately, using the proposed method. The motion of an object may cause some portions of the background to be covered by the object, or conversely, may cause some covered portions of the background to be uncovered. The performance of the segmentation obtained by this invention does not degrade even in these cases. Additionally, this method can individually track distinct objects moving independently of each other, including those objects which come to a stop. Moreover, some complicated situations such as the splitting or merging of moving objects (i.e. by articulated motion) can be handled.

DESCRIPTION OF THE PREFERRED EMBODIMENTS

Figure 1:
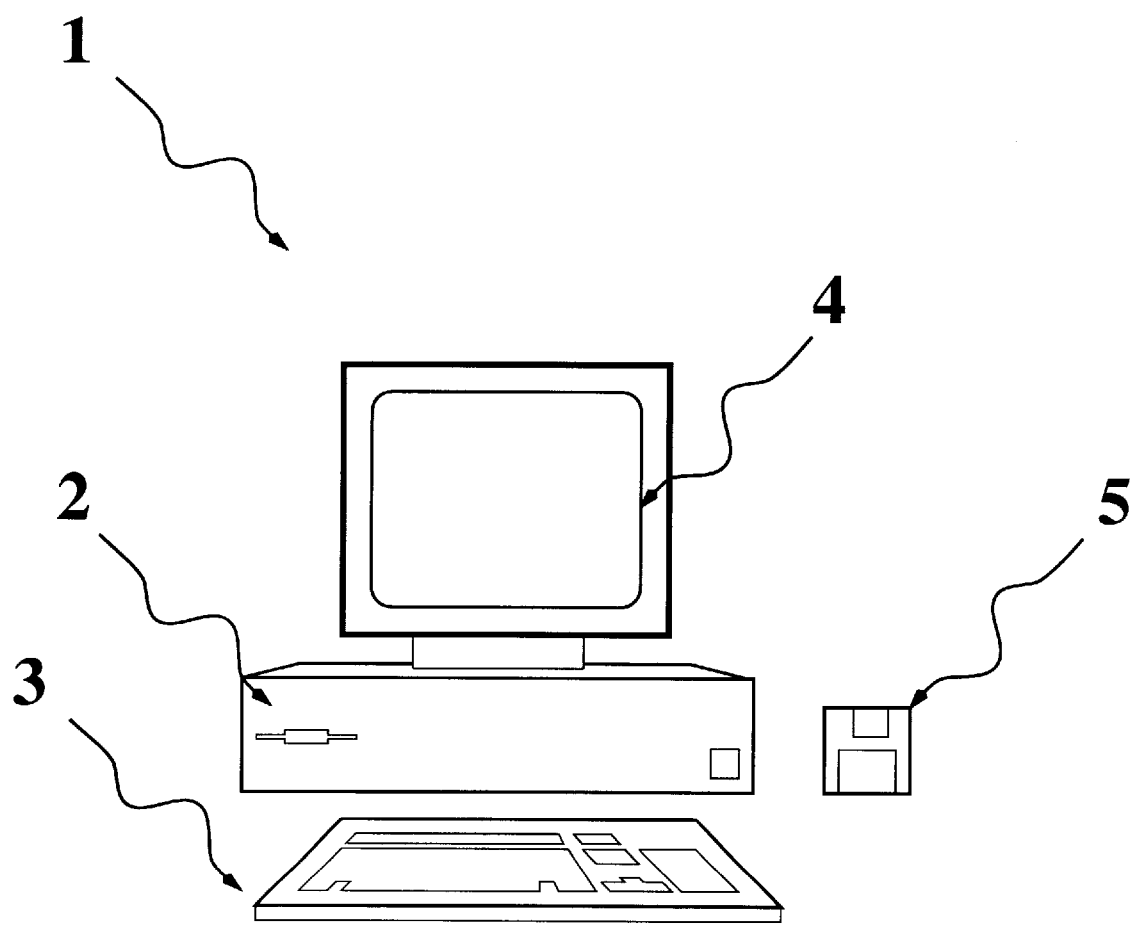
FIG. 1. The computer system on which the invention is implemented.

The disclosed invention is implemented on the computer system shown in FIG. 1. The computer system (1) shown in FIG. 1 consists of the central processing unit (2), the keyboard (3), the monitor (4), and the floppy diskette (5). The central processing unit (2) can read and run special computer programs and displays the outputs on its monitor (4). The user can give commands to the central processing unit (2) by the help of the keyboard (3). Written programs and the input data are read from the floppy diskette (5). The inputs are used by the central processing unit (2) and the outputs can either be displayed on the monitor (4) or saved to the diskette (5). Computer systems similar to the one in FIG. 1 can also be used for the implementation of the invention. As a more complex system, an analog video camera instead of a diskette can be used to obtain the input video. The video recorded by this camera can be digitized and transferred to the central processing unit by a frame grabber mounted on the computer.

Digital color video frames are given as input to the above system using the floppy diskette (5). The output is another digital image sequence where different objects are represented by different colors. This sequence can either be displayed on the monitor (4) or saved onto the diskette (5). The digital video inputs and outputs are well known by those who work in this field; for example ISO CCIR601 standard deals with the digitization of video recorded by an analog camera.

The invention, when implemented as a computer program, provides the outputs which are generated by the central processing unit (2) from the inputs given to the system (1).

Figure 2:
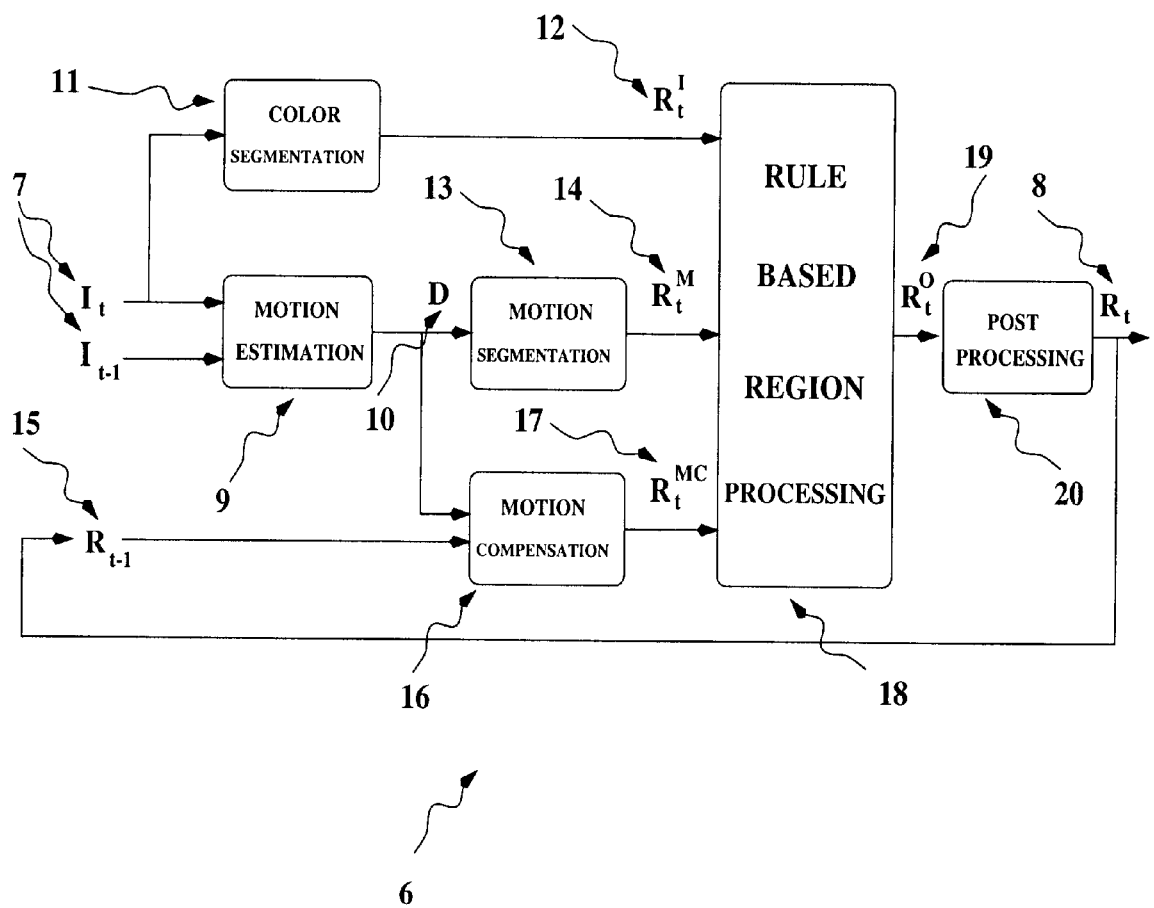
FIG. 2. The block diagram showing the realization of the rule-based moving object segmentation method.

FIG. 2 shows the system (6) which takes the video frames $I_t$, and $I_{t-1}$, (7) at time instants t and t−1, respectively. The instant t is the reference time and t−1 is the previous time. The output corresponding to this pair of frames is the mask $R_t$ (8).

The 2-D motion vectors between consecutive video frames are estimated by the Motion Estimation (9) block using the algorithm given by M. Bierling, "Displacement estimation by hierarchical block matching," in Proceedings of SPIE Visual Communications and Image Processing 88, pp. 942–951, 1988. The output of this block is the set of 2-dimensional motion vectors (10) which represent the motion between the consecutive video frames. These vectors are defined for the non-overlapping square blocks over the frame at instant t which is taken as the reference time. In order to estimate the motion of these blocks, the colored frames are converted to gray-scale with a known method (M. Tekalp, Digital Video Processing, Prentice-Hall, 1995). Motion vector for a block is found by minimizing the gray level difference between that block, and the block which is on the previous frame at time t−1 but located at a distance as indicated by the motion vector. With a simple interpolation scheme, motion vectors which are defined only for blocks are converted to dense motion vectors which are defined on every single pixel.

The image frame at the reference time is segmented into regions, where colors of pixels in a region are similar, using the color segmentation method (11) which is given by O. J. Morris, M. J. Lee, A. G. Constantinides, "Graph Theory for Image Analysis: an Approach based on the Shortest Spanning Tree," IEE Proceedings, vol.133, pp. 146–152, April 1986. The color segmentation method takes 3-dimensional color vectors (red, green, blue) defined on each pixel as input. This method initially assumes each pixel as a separate region, and recursively merges neighboring regions based on a cost function defined between these neighboring regions. The cost function for color images is defined as the magnitude of the difference vector between the average color vectors of the two neighboring regions. After every iteration, as the neighboring regions which have the minimum cost function between them are merged, the new cost functions between neighboring regions over the new pattern and the average color vectors of these new regions are re-calculated. The recursion stops when the number of regions is reduced to a pre-defined value. The output of this method is the segmentation mask $R_t^I$ (12) which contains a predefined number of segmented regions.

The same segmentation method mentioned above is also used to segment the dense 2-D motion vector set (10). During this segmentation (13), the 2-D motion vectors are used as the input instead of the 3-D color vectors. Every region in the output segmentation mask $R_t^M$ (14) takes a label indicating either the region is stationary or moving, by thresholding the average 2-D motion vectors inside that region; This label is used in next phases for the segmentation of objects.

For object tracking purposes, the segmentation result for the previous frame $I_{t-1}$ is also needed to obtain the segmentation result for the current frame $I_t$. For this purpose, the previous segmentation result $R_{t-1}$ (15) is translated by the motion vectors estimated at time t (10). Thus, a prediction for the final estimate $R_t$ (8) at time t is provided by the translated segmentation mask $R_t^{MC}$ (17) which is obtained by translating (16) the mask (15) in time. The moving/stationary labels of the regions in $R_t^{MC}$ (17) are obtained by directly carrying the corresponding labels from $R_t$ (15).

As a result of the application of a sequence of rules to the segmentation masks $R_t^I$ (12), $R_t^M$ (14) and $R_t^{MC}$ (17) by the Rule-Based Region Processor (18), a single segmentation mask $R_t^O$ (19) is obtained.

Another point which needs some elaboration before the explanation of the rules is the enumeration of the regions for various purposes. Each region is assigned a different number and each such number is also indicated by a corresponding color. For example, during the tracking of an object, it is essential that the number (color) of that object on the segmentation result $R_t$ (8) do not change. Therefore, the number of an object which is moving, or has come to a stop, must stay the same in time. Similarly, the regions over the color segmentation mask $R_t^I$ (12) and motion segmentation mask $R_t^M$ have their distinct numbers.

Figure 3:
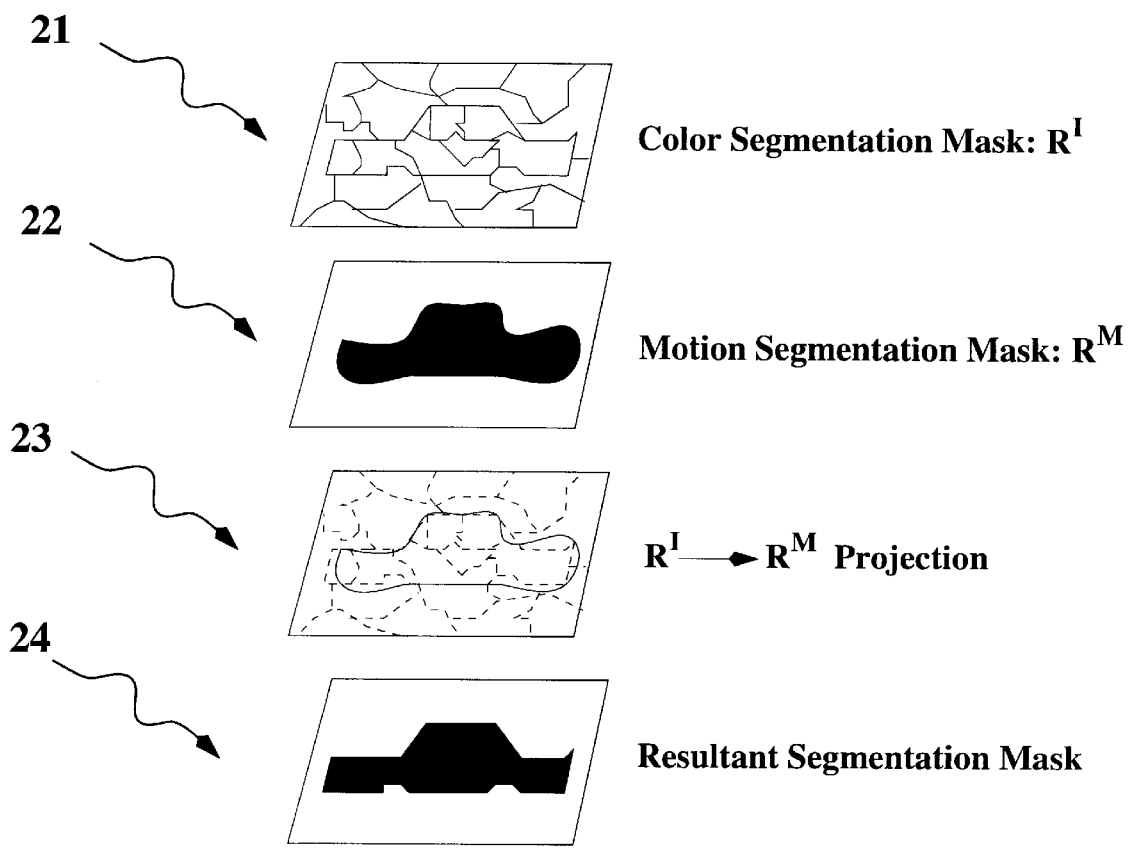
FIG. 3. Projection of one segmentation mask onto another.

In order to obtain the final segmentation, each region on the mask $R_t^I$ is assigned two more numbers in addition to its own region number. In the example, which is shown in FIG. 3, the color segmentation mask (21) is projected onto the motion segmentation mask (22) and the intersection mask (23) is obtained. After the projection, every region in (21) is overlapped by one or more regions from (22). So, every region in (21) takes the number of the region in (22), whose intersection area with the region in (21) is the largest among other intersection areas, as the second number. (24) shows the regions in (21) painted according to their second numbers. Similarly, the color segmentation mask $R_t^I$ (12) is projected onto the motion compensated segmentation mask $R_t^{MC}$ (17). Every region in $R_t^I$ takes the number of the region in (17), whose intersection area with the region in (12) is the largest among other intersection areas, as the third number.

In order to make a stationary/moving decision about a region in $R_t^I$ (12), the stationary/moving label of the region in $R_t^M$ (14) corresponding to this second number, is used.

While forming the composite segmentation mask $R_t^O$ (19), the most important rule is that the objects in this mask are obtained by merging the regions in $R_t^I$. This merging is achieved by using the second and the third numbers, which are already obtained from $R_t^M$ (14) and $R_t^{MC}$ (17) and assigned to regions in $R_t^I$, and the abovementioned moving/stationary labels. So, it is for sure that the boundaries of the objects on $R_t^O$ are obtained using only the accurate boundaries supplied by the color segmentation mask $R_t^I$, and therefore, these boundaries are independent of motion estimation errors and existence of occlusion regions.

The stationary background of the scene is obtained by the help of the stationary regions in $R_t^{MC}$ (17). If a region remains stationary longer than a pre-determined period without a lapse, that region is joined to the background.

The neighboring regions in $R_t^I$ (12), whose third numbers are the same, are grouped together. For each group, if the region in $R_t^{MC}$ (17) corresponding to this third number is moving (or stationary) and all the regions in the group are also moving (or stationary), all the regions in that group are merged and carried to the composite segmentation mask $R_t^O$ (19) with the common third number as the region number and with the moving (or stationary) label. A group like this must be an object which continues to be moving (or stationary).

Similarly, for each group of regions in $R_t^I$ that are formed to have their third numbers equal, if the region in $R_t^{MC}$ (17) corresponding to that third number is moving (or stationary) but all the regions in the group are stationary (or moving), all the regions in that group are merged and carried to the composite segmentation mask $R_t^O$ (19) with the common third number as the region number and with a "stationary" (or "moving") label. A group like this must be a moving object which comes to a halt (or a still object which starts to move).

If both types of regions (moving and stationary) co-exist in a group of regions on the mask $R_t^I$ (12), the corresponding object defined by $R_t^{MC}$ in the past (17) is assumed to split into stationary and moving objects. This case occurs when the object splits or some parts of the object move differently as in articulated motion.

Furthermore, a new object that shows up in a previously stationary scene can also be detected in this manner.

For the case mentioned above paragraph, if the region in $R_t^{MC}$ (17) corresponding to the common third number is moving, all the moving regions and all the stationary regions in that group are merged separately and carried to the composite segmentation mask $R_t^O$ (19) with the corresponding label; the borders of the carried regions are taken from the $R_t^I$ mask. Between these two newly formed regions (one moving, and one stationary), the one with the greater size takes the common third number as a region number and the other one is assigned a new number (color). Similarly, if the region in $R_t^{MC}$ (17) corresponding to the common third number is stationary, each one of the moving regions in the group are carried to the composite segmentation mask $R_t^O$ (19) as a moving object with a moving label; however, all the stationary regions in that group are merged and carried to $R_t^O$ as a single stationary object with a stationary label. Among these (at least two) newly formed regions (one stationary and several moving), the one with the greatest size takes the common third number as a region number and the others are assigned new numbers.

After the composite segmentation mask $R_t^O$ (19) is formed as a consequence of the abovementioned rules, it is post-processed by the post-processing unit (20). Here, small or oversplit regions are checked for the last time to see whether they can be merged with their neighbors or not. A moving (or stationary) region whose size is smaller than a pre-determined threshold (20 pixels, total), is joined to the moving (or stationary) neighboring region with the largest size. If no such region exists, then the small region is joined to the stationary (or moving) neighboring region with the largest size.

In this last post-processing step (20), a moving region larger in size than the above threshold is merged with the moving neighboring region with the largest size, if such a neighbor exists. The object obtained after merging takes the number of the merged region whose size is larger. Another type of merging is not allowed and the final configuration obtained by merging the regions is called the segmentation result $R_t$ (8).

Applications of the Invention to the Industry

By the help of this invention, segmented video inputs can be supplied to object-based video compression systems based on standards in that field. Object-based coding algorithms, which are expected to find applications in a wide range of areas including interactive TV and computer games, can be implemented by utilizing the segmented video outputs obtained as described in this invention.

We claim:

1. A method of detecting, segmenting and tracking moving objects in an image sequence, comprising,
   a) obtaining a color segmentation mask by segmenting a given frame at a reference instant to regions using color information of that frame, and assigning a distinct region number to each region resulting from this segmentation;
   b) estimating motion between a video frame at a reference instant and a preceding saved video frame at a previous instant;
   c) obtaining a motion segmentation mask by segmenting this estimated motion information, and assigning a distinct region number to each region resulting from this segmentation;
   d) predicting a final segmentation mask at the reference instant by translating, using the estimated motion information, the previously obtained and saved final segmentation mask, and assigning a distinct region number to each region of the predicted final segmentation mask by copying the corresponding region numbers from the previous final segmentation mask;
   e) creating a composite segmentation mask, by merging, via a sequence of rules, the color segmentation mask, the motion segmentation mask and the segmentation mask obtained by translating the previous final segmentation mask;
   f) creating current final segmentation mask by post-processing the regions in the composite segmentation mask.

2. The method in claim 1 in which the assignment of a second number, in addition to the region number, to each region of the color segmentation mask of claim 1 step a) is done by using the region numbers of the motion segmentation mask of claim 1 step c).

3. The method in claim 2 in which the second numbers are found by a method comprising,
   a) aligning the color segmentation mask and the motion segmentation mask,
   b) finding the intersections of a selected region on the color segmentation mask and each one of the regions on the motion segmentation mask after the alignment in step a),
   c) finding the intersection whose area is the largest among the intersections of step b),
   d) finding the region number of the motion segmentation mask region which corresponds to the intersection found in step c), and assigning this number as the second number of the selected region in step b),
   e) assigning a second number to all the regions on the color segmentation mask by repeating the steps in steps b), c) and d) for each one of these regions.

4. The method in claim 1 in which a third number, in addition to the previously assigned two numbers, is assigned to each region of the color segmentation mask by using the region numbers of the regions on the segmentation mask which is obtained by translating the previous final segmentation mask.

5. The method claimed in 4, where the assignment of the third number is done by,
   a) aligning the color segmentation mask and the translated previous final segmentation mask;

b) finding the intersections, of a selected region on the color segmentation mask and each one of the regions on the segmentation mask which is obtained by translating the previously obtained final segmentation mask, after the alignment claimed in step a), c) finding the intersection whose area is the largest area among the intersections claimed in step b), d) finding the region number of the translated previously obtained final mask region which corresponds to the intersection found in step c), and assigning this number as the third number of the selected region in step b), e) the assignment of a third number to all the regions on the color segmentation mask by repeating the steps in steps b), c) and d) for each one of these regions.

6. The method in claim 1 in which each region of the motion segmentation mask claimed in claim 1 step c) is labeled as a moving region if the average of all the motion vectors included in this region exceeds a given threshold; otherwise, it is labeled as a stationary region.

7. The method in claim 1 in which each region on the previously obtained final segmentation mask claimed in claim 1 step d) is labeled as either moving or stationary by copying the label of the corresponding region in the previously obtained final segmentation mask.

8. The method in claim 1 in which the composite mask claimed in claim 1 step e) is obtained through a sequence of rules comprising, a) grouping of the color segmentation mask regions whose third numbers are the same; carrying this group of regions as a single region into the composite segmentation mask by labeling this single region as a moving region if all the regions on the translated previous segmentation mask corresponding to the common third number are labeled as moving regions, and if all the regions on the motion segmentation mask corresponding to the second numbers of the regions in the group are also labeled as moving regions; assigning the common third number of the color segmentation mask regions as the region number of this single region on the composite segmentation mask, b) grouping of the color segmentation mask regions whose third numbers are the same; carrying this group of regions as a single region into the composite segmentation mask by labeling this single region as a stationary region if all the regions on the translated previous segmentation mask corresponding to the common third number are labeled as stationary regions, and if all the regions on the motion segmentation mask corresponding to the second numbers of the regions in the group are also labeled as stationary regions; assigning the common third number of the color segmentation mask regions as the region number of this single region on the composite segmentation mask, c) grouping of the color segmentation mask regions whose third numbers are the same; carrying this group of regions as a single region into the composite segmentation mask by labeling this single region as a moving region if all the regions on the translated previous segmentation mask corresponding to the common third number are labeled as stationary regions, and if all the regions on the motion segmentation mask corresponding to the second numbers of the regions in the group are labeled as moving regions; assigning the common third number of the color segmentation mask regions as the region number of this single region on the composite segmentation mask, d) grouping of the color segmentation mask regions whose third numbers are the same; carrying this group of regions as a single region into the composite segmentation mask by labeling this single region as a stationary region if all the regions on the translated previous segmentation mask corresponding to the common third number are labeled as moving regions, and if all the regions on the motion segmentation mask corresponding to the second numbers of the regions in the group are labeled as stationary regions; assigning the common third number of the color segmentation mask regions as the region number of this single region on the composite segmentation masks, e) grouping of the color segmentation mask regions whose third numbers are the same; splitting this group into two parts and carrying these two parts into the composite segmentation mask if all the regions on the translated previous segmentation mask corresponding to the common third number are labeled as moving regions, but not all the regions on the motion segmentation mask corresponding to the second numbers of the regions in the group are labeled as moving regions; labeling these two regions by copying the labels from the regions in the motion segmentation mask corresponding to their second numbers; assigning the common third number of the group as the region number of the larger of the two regions and assigning a new region number to the smaller one, f) grouping of the color segmentation mask regions whose third numbers are the same; splitting this group into multiple parts and carrying these multiple parts into the composite segmentation mask if all the regions on the translated previous segmentation mask corresponding to the common third number are labeled as stationary regions, but not all the regions on the motion segmentation mask corresponding to the second numbers of the regions in the group are labeled as stationary regions; labeling these regions by copying the labels from the regions in the motion segmentation mask corresponding to their second numbers; assigning the common third number of the group as the region number of the largest of these regions and assigning a new region number to the other ones.

9. The method in claim 1 in which the post-processing claimed in claim 1 step f) carries the regions of the composite mask, together with their labels and numbers, to the final segmentation mask.

10. The post-processing in claim 9 in which if the size of a region in the composite segmentation mask is smaller than a threshold, then the region number of this region is altered by copying the region number of its largest size neighbor region having the same type of label as this small region; then the region is carried to the final segmentation mask.

11. The post-processing in claim 9 in which if the size of a region in the composite segmentation mask is larger than a threshold, and if it is labeled as a moving region, then the region number of this region is altered by copying the region number of its largest size neighbor region having the moving region label; then the region is carried to the final segmentation mask.

* * * * *